United States Patent [19]

Stephenson

[11] Patent Number: 5,532,482
[45] Date of Patent: Jul. 2, 1996

[54] METHOD AND APPARATUS FOR WELL LOGGING USING AN ACCELERATOR NEUTRON SOURCE

[75] Inventor: Kenneth E. Stephenson, Newtown, Conn.

[73] Assignee: Schlumberger Technology Corporation, Ridgefield, Conn.

[21] Appl. No.: 494,497

[22] Filed: Jun. 26, 1995

Related U.S. Application Data

[63] Continuation of Ser. No. 226,737, Apr. 12, 1994, abandoned.

[51] Int. Cl.$^6$ .................................................. G01V 5/10
[52] U.S. Cl. ................................ 250/269.4; 250/390.01
[58] Field of Search ........................... 250/269.4, 390.01

[56] References Cited

U.S. PATENT DOCUMENTS

| | | | |
|---|---|---|---|
| 3,102,198 | 8/1963 | Bonner | 376/153 |
| 3,240,971 | 3/1966 | Morgan | 376/153 |
| 3,483,376 | 12/1969 | Locke et al. | 250/392 |
| 3,566,117 | 2/1971 | Tixier | 250/264 |
| 3,775,216 | 11/1973 | Frentrop | 156/293 |
| 4,005,290 | 1/1977 | Allen | 250/266 |
| 4,097,737 | 6/1978 | Mills, Jr. | 250/269.4 |
| 4,268,749 | 5/1981 | Mills, Jr. | 250/269.4 |
| 4,476,391 | 10/1984 | Bednarczyk | 250/390.01 |
| 4,556,793 | 12/1985 | Allen et al. | 250/267 |
| 4,581,532 | 4/1986 | Givens et al. | 250/266 |
| 4,604,522 | 8/1986 | Arnold | 250/264 |
| 4,631,405 | 12/1986 | Smith, Jr. | 250/266 |
| 4,638,161 | 1/1987 | Smith, Jr. et al. | 250/269.4 |
| 4,641,028 | 2/1987 | Taylor et al. | 250/266 |
| 4,760,252 | 7/1988 | Albats et al. | 250/390.07 |
| 5,160,844 | 11/1992 | Albats | 250/390.07 |

FOREIGN PATENT DOCUMENTS

| | | |
|---|---|---|
| 0387449 | 12/1989 | European Pat. Off. . |
| 828917 | 4/1956 | United Kingdom . |
| WO87/07733 | 6/1986 | WIPO . |

OTHER PUBLICATIONS

H. F. Atwater, "*Monte Carlo Calculation of Recoil Spectra in $^4$He Proportional Counters*", Nuclear Instruments and Methods 100, North–Holland Publishing Co. (1972) 453–457.

*Primary Examiner*—Constantine Hannaher
*Attorney, Agent, or Firm*—Martin D. Hyden; Leonard W. Pojunas

[57] ABSTRACT

A method of determining a characteristic of an underground formation including the steps of irradiating the formation with high energy neutrons and detecting neutrons scattered by the formation having energies above epithermal to determine the nature of the formation matrix. Epithermal neutrons can also be detected to determine formation porosity. Apparatus includes a high energy neutron source, typically a D-T accelerator producing 14 MeV neutrons, and detectors such as $^4$He filled proportional counters for detecting neutrons having energies above epithermal and $^3$He filled proportional counters for detecting epithermal neutrons.

34 Claims, 5 Drawing Sheets bbbbbb# METHOD AND APPARATUS FOR WELL LOGGING USING AN ACCELERATOR NEUTRON SOURCE This application is a file wrapper continuation of parent application Ser. No. 08/226,737, filed Apr. 12, 1994, now abandoned.

FIELD OF THE INVENTION

The present invention relates to a method and apparatus for well logging to determine a characteristic of an underground formation through which the well passes. In particular the invention relates to a logging technique which uses an accelerator neutron source.

DESCRIPTION OF THE PRIOR ART

The use of a neutron source in a logging tool for obtaining a characteristic of a formation surrounding a borehole is well known, particularly in the derivation of formation porosity. Certain techniques involve the use of a chemical source such as $^{252}$Cf, AmBe or PuBe to provide neutrons to irradiate the formation such that scattered neutrons returning to the borehole can be detected and the formation characteristic (porosity) inferred. Such tools and methods are described in U.S. Pat. No. 3,483,376 and U.S. Pat. No. 3,566,117. However, chemical neutron sources have several disadvantages due to the problems in handling and shipping sources containing radioactive materials due to concerns over radioactive safety and other such matters. It has been proposed to use an accelerator neutron source in such logging tools which overcomes these problems since neutrons are only produced when the source is activated in use in the borehole. Examples of accelerator neutron sources are those based on the deuterium-tritium (D-T) reaction which produces 14MeV neutrons, the deuterium-deuterium (D-D) reaction which produces 2.5 MeV neutrons and the tritium-tritium (T-T) reaction which produces neutrons in the range 1–10 MeV with an average energy of about 5 MeV. An example of a D-T accelerator source is described in U.S. Pat. No. 3,775,216 and an example of a well logging tool incorporating a D-T source is described in U.S. Pat. No. 4,760,252 (incorporated herein by reference). The '252 patent describes a neutron porosity logging tool in which an accelerator source is used to irradiate the underground formation and epithermal and thermal neutrons returning from the formation are detected. Scattering of neutrons in the formation at epithermal and thermal energies is due to interaction of the neutrons with hydrogen nuclei and so monitoring the neutrons at these energies is used to estimate the porosity of the formation since hydrogen is only associated with pore fluids rather than the rock matrix.

The neutron porosity is essentially a measurement of hydrogen density in the formation. However, an increase in matrix density for a formation can result in a decrease in count rate for a neutron porosity tool in much the same way that an increase in porosity would cause a decrease in count rate. Since it is not possible to determine which effect is causing the change merely by considering the neutron count, it is necessary to obtain an independent determination of the formation density. Typically, the formation density is obtained from a tool which makes use of Compton scattering of γ rays by electrons to make formation matrix density measurements. The density tool requires a source of γ rays, typically a $^{137}$Cs isotopic source. As with neutron sources, the use of chemical γ ray sources is undesirable but there is no current accelerator-based alternative which might be used instead. Changes in matrix density and porosity have complementary effects on neutron and Compton density tools and can be determined by cross plotting neutron porosity and density. However, the inclusion of gas in the matrix pores cannot be distinguished from a decrease in matrix density since neither the neutron response nor the Compton scattering response will show anything which could be attributed solely to the presence of gas.

The tool described in the '252 patent uses $^{3}$He filled proportional counters to detect neutrons. Such counters are typically filled with $^{3}$He at pressures in the 10–15 atmospheres range although it has been proposed to use pressures as high as 20 atmospheres in proportional neutron counters (see U.S. Pat. No. 3,102,198) and even up to 40 atmospheres, and are sensitive mainly to epithermal and thermal neutrons. With these detectors it is not possible to make accurate measurements at energies above epithermal, i.e. in the MeV energy range, but since measurements in this energy region do not give information about porosity, this has not been considered a problem. $^{3}$He proportional counters suffer from certain problems. The signal in a $^{3}$He counter is produced by a proton which is the result of the reaction between a He nucleus and a neutron. However, signals can also be produced by the interaction of a $^{3}$He nucleus with a Tray and this interferes with the signal produced by neutron interactions. The normal approach to discriminating between neutron and γ ray induced events is by peak height/signal strength analysis since the neutron induced events occur at different energies to γ ray events. This problem is compounded by increasing the He pressure inside the counter which, while increasing the sensitivity of the counter to neutron events, makes the counter comparatively more sensitive to γ ray induced events and so the interfering effect is greater. This problem is particularly significant in a borehole environment where the naturally occurring γ ray activity is high.

$^{4}$He has been used in proportional counters for detecting neutrons having MeV energies. However, $^{4}$He has a strong resonance at 1 MeV which makes the neutron response highly energy dependent. Furthermore, $^{4}$He has a cutoff in the response below 1 MeV which makes it insensitive to epithermal neutrons. For this reason, $^{4}$He has not been considered as generally acceptable for proportional counters in neutron detectors.

It is an object of the invention to provide a neutron logging method and apparatus which can be used to obtain information of the formation matrix and identify the presence of gas in the formation.

It is also an object of the present invention to provide a He filled proportional counter for use in a neutron detector in which the problems outlined above are obviated or mitigated.

SUMMARY OF THE INVENTION

Broadly, the present invention comprises a borehole neutron logging tool including neutron detectors which are sensitive to neutrons with energies higher than epithermal, typically in the MeV energy region.

A first aspect of the present invention comprises a method of determining a characteristic of an underground formation through which a borehole passes comprising irradiating the underground formation with neutrons using a tool comprising a neutron source and a neutron detector, detecting neutrons originating from the source with the neutron detector at energies higher than epithermal so as to produce a signal, and using the signal to determine the characteristic of the underground formation.

A second aspect of the invention comprises an apparatus for determining a characteristic of an underground formation through which a borehole passes comprising a neutron source for irradiating the underground formation with neutrons when the apparatus is positioned in the borehole and a neutron detector for detecting neutrons originating from the source having energies higher than epithermal so as to produce a signal related to the characteristic of the underground formation.

It has been found that the response of a $^4$He proportional counter is particularly suited for use in a borehole environment since it is responsive to neutrons with energies above epithermal and it is easier to discriminate between neutron and γ ray induced events such that the pressure can be increased to a higher level than would be practical in a $^3$He.

A third aspect of the invention comprises the use of a $^4$He detector in a neutron logging tool.

In one embodiment, the invention comprises a technique for determining the nature of the underground formation matrix, comprising irradiating the formation with 14 MeV neutrons from a D-T accelerator and detecting neutrons at about 1 MeV which have passed through the formation and have been slowed down by scattering with nuclei in the formation so as to determine the slowing down length for the 14-1 MeV transport which can be used to give useful information about the composition of the formation and the presence of gas.

In another embodiment, the invention comprises a technique for monitoring the flow of neutrons directly from the accelerator source, typically a D-T accelerator producing 14 MeV neutrons, and which have not passed through the underground formation. In this case it is preferred to shield the high energy detector with a high Z material such as tungsten.

It is preferred that the detector comprises a high pressure $^4$He proportional counter and that the $^4$He pressure in the counter be as high as possible, typically in the region of 40 atmospheres. Where the detector is used to detect neutrons which have been scattered by the formation, the high Z shielding is absent.

DETAILED DESCRIPTION OF THE PREFERRED EMBODIMENTS

Figure 1:
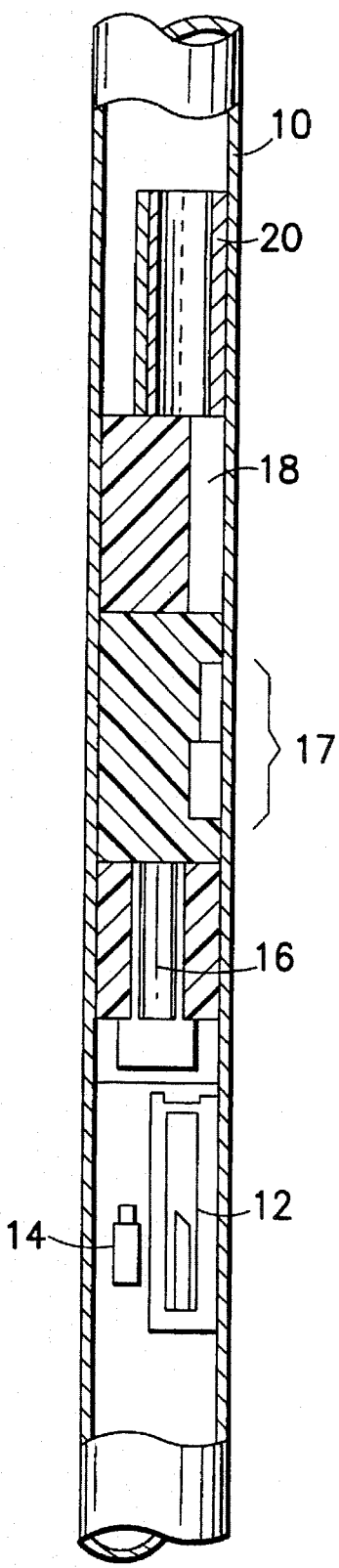
FIG. 1 shows an embodiment of a prior an neutron logging tool.

Referring now to the drawings, FIG. 1 shows a schematic view of a prior art tool as described in U.S. Pat. No. 4,760,252. The tool comprises a tool body or sonde 10 which can be lowered into a borehole and logged using a wireline cable in the conventional manner. The sonde 10 includes a DT accelerator neutron source 12, a source monitor 14 for monitoring the neutron output of the source 12, a near epithermal neutron detector 16, a thermal/epithermal neutron detector array 17, a far epithermal neutron detector 18 and a thermal neutron detector 20. The monitor 14 can typically comprise a scintillator and photo multiplier tube arrangement and the detectors 16, 17, 18 and 20 are 15 atm $^3$He proportional counters having appropriate shielding in the form of Cd metal and B$_4$C epoxy. A tool according to the present invention will have generally the same configurations this prior art tool, but with the differences which will be described below.

Figure 2:
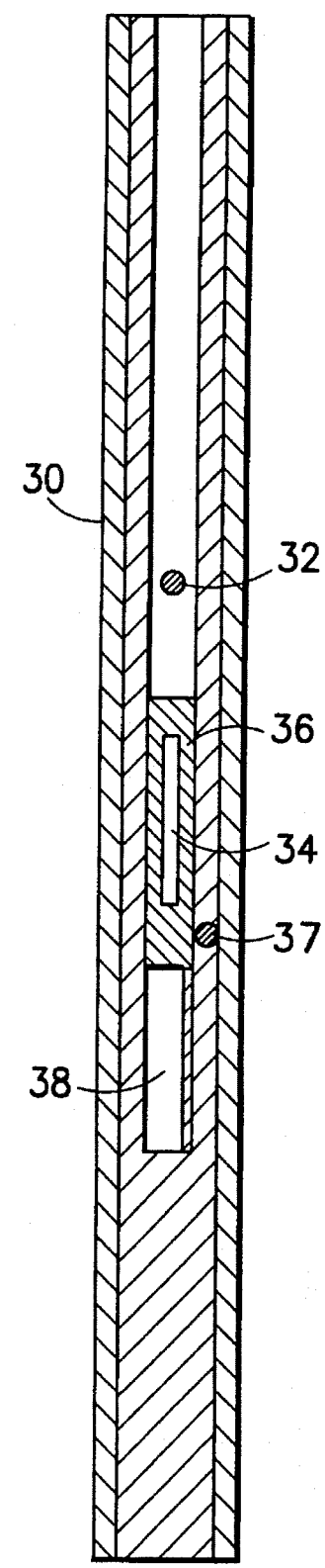
FIG. 2 shows a schematic cross section of a tool according to one embodiment of the invention.

FIG. 2 shows a schematic view of a tool according to one embodiment of the present invention. The tool comprises a sonde 30 including a D-T accelerator neutron source 32 which produces 14 MeV neutrons when activated, a near neutron detector 34 comprising a 40 atm $^4$He proportional counter shielded with a layer of tungsten 36 (or other high −Z material such as tantalum, uranium, lead and bismuth). Preferentially, the path length of 14 MeV neutrons through the shielding material should be at least 1 mean-free-path for an (n, 2n) reaction, which for tungsten is 7.9 cm. A far neutron detector 38 comprises a further 40 atm $^4$He proportional counter. The counters 34 and 38 are located 5"–9" and 20"–75" from the source 32, respectively. In an alternative embodiment, the near detector can comprise some form of source monitor other than a $^4$He counter such as a scintillator in which case the high-Z shielding might not be required. Another alterative comprises $^3$He proportional counters as well as $^4$He proportional counters as the near and/or far detectors in order to measure epithermal and thermal neutrons as well as those of MeV energies. An intermediate detector array 37 can also be present.

The 40 atm $^4$He proportional counters 34, 38 are of similar size and shape to the conventional 15 atm $^3$He counters and the output signal is in a generally similar form. Certain aspects of the counter construction may need to be different to withstand the higher pressure inside the counter. 40 atm $^4$He proportional counter of the type described can be obtained from GE Reuter Stokes Inc. of Twinsburg, Oh., USA.

Figure 3:
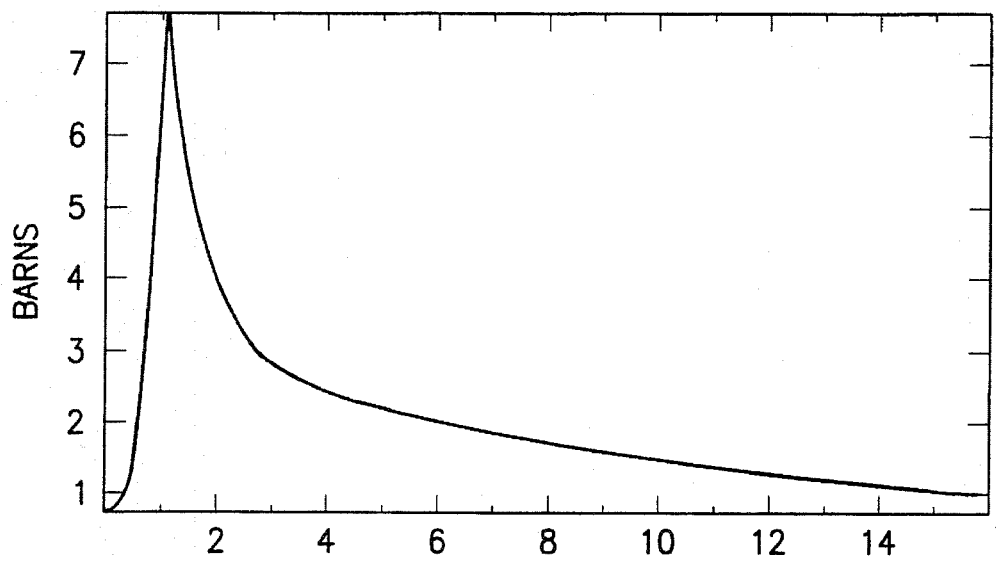
FIG. 3 shows the $^4$He scattering cross section for neutrons in the 0–14 MeV range.
Figure 4:
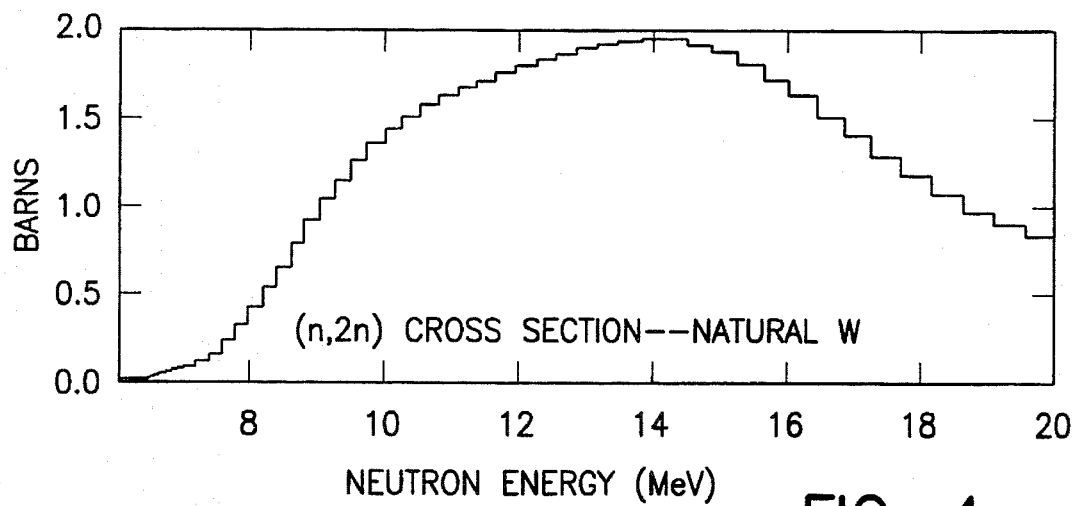
FIG. 4 shows the cross section for the reaction between neutrons and the tungsten nucleus.

The $^4$He scattering cross section for neutrons in the 0–14 MeV energy range is shown in FIG. 3. There is a scattering cross section resonance near 1 MeV and both scattering and absorption (not shown) cross sections are low below this energy. Consequently, the detector is relatively insensitive to epithermal and thermal neutrons. The scattering spectrum does not have any strong peaks which can be used for gain stabilization so an internal α-source, such as $^{234}$U may be added. Such gain stabilization requires a pulsed accelerator so that the α-source counts can be accumulated during source-off periods. The 1 MeV resonance might normally be considered detrimental to the performance of a neutron detector. However, it has been found that this feature can be put to use when using a 14 MeV neutron source both when attempting to obtain the characteristics of the formation matrix and when attempting to discriminate against epithermal neutrons. When the counter is being used as a source monitor, the neutrons interact with tungsten nuclei in the shielding to produce two product neutrons (another possible reaction produces three product neutrons). This reaction has a negative Q value equal to the binding energy of a neutron, approximately −6.5 MeV. The remaining 7.5 MeV is shared among the product neutrons. The cross section for this reaction is shown in FIG. 4 and given the high nuclear density in metallic tungsten, the interaction probability is large (mean free path for an (n,2n) reaction is 7.9 cm). Thus the effect of the shielding not only increases the number of neutrons entering the counter due to the (n, 2n) reaction, but also brings these neutrons into the highly sensitive range of the counter around 1 MeV. The high threshold for the reaction discriminates against neutrons which have scattered many times, such as in the formation, with a corresponding loss in energy and the low energy cut off in the detector response described above means that the detector is less sensitive to neutrons which have not traveled directly from the source. In a conventional $^3$He source monitor about 50% of the detected neutrons have been scattered by the formation rather than emanating directly from the source whereas in the tungsten shielded high pressure $^4$He detector this figure is reduced to about 20%.

The other effect of shielding the source monitor in this manner is to reduce the flow of 14 MeV neutrons along the tool to the far detector. To prevent lower energy (near 1 MeV) neutrons from the (n, 2n) reaction in the shielding from reaching the far detector, hydrogenous shielding material may be placed between the source monitor and the far detector. This means that substantially all 1 MeV neutrons detected at the far detector result from interaction with the formation. If the near detector/source monitor is not a $^4$He counter with tungsten shielding, it may be necessary to place some high-Z and hydrogenous shielding in the sonde to reduce the neutron flux through the tool directly from the source to the far detector.

Figure 5:
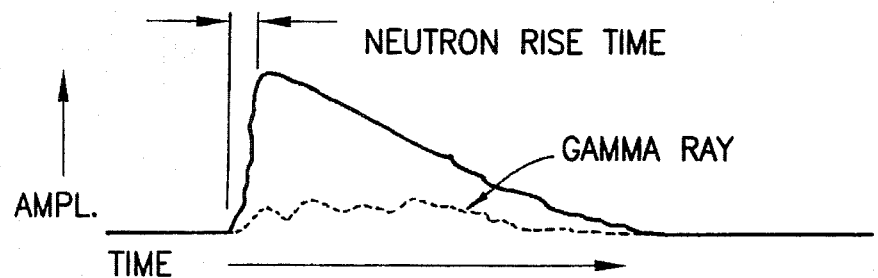
FIG. 5 shows the $^4$He detector response against time for neutrons and γ rays.

FIG. 5 shows the amplitude of the high pressure $^4$He detector response against time with both signals due to neutrons and γ rays shown. As can be seen, the neutron induced signal is predominantly fast (~150 ns), low energy $^4$He recoil with some slower, high energy $^4$He recoil. The γ ray signal is predominantly slow (up to 10 ns). One way to discriminate between neutron and γ ray signals is to monitor only the first section of the signal, the fast signal, since this is mainly due to neutrons with little contribution from γ rays. The portion of the signal to be measured can be determined from the variation in neutron signal with time and the time required up to the peak in the neutron signal is chosen. This is typically in the 100–150 ns range.

Figure 6A:
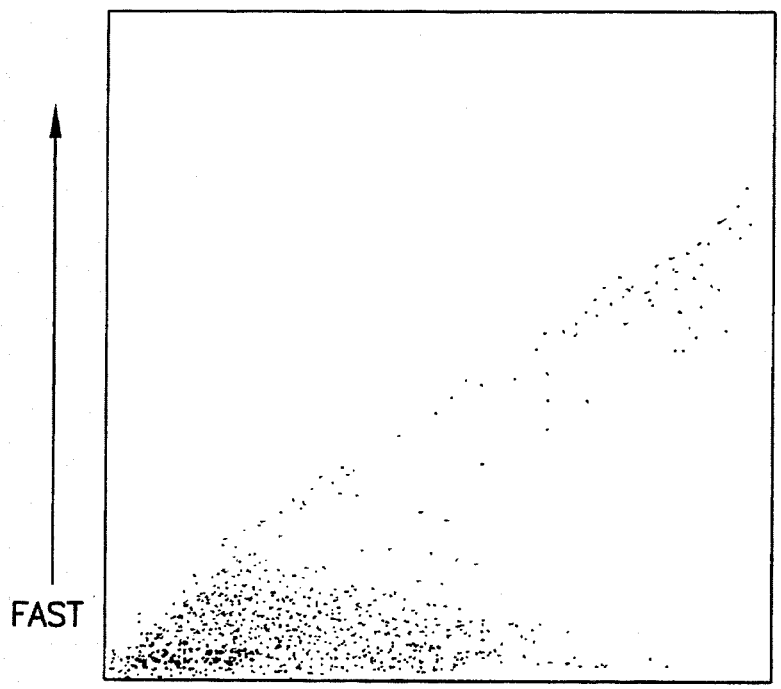
FIG. 6a shows a cross plot of fast and slow channel signals when the neutron source is inactive.
Figure 6B:
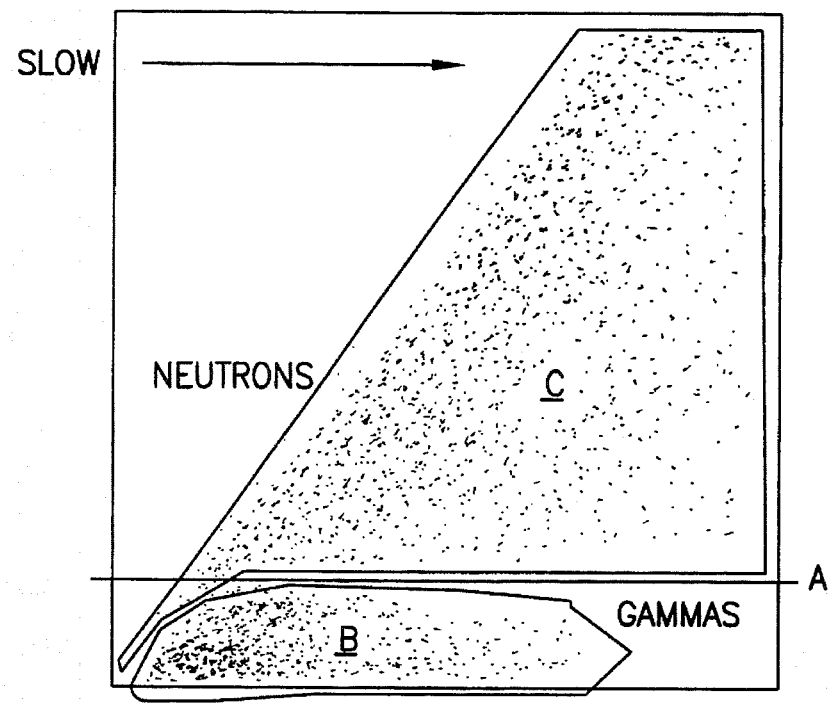
FIG. 6b shows a cross plot of fast and slow channel signals when the neutron source is active.

In order to obtain information about the total neutron signal it is necessary to consider both fast and slow signals and so the contribution of γ rays must be removed. FIG. 6a comprises a cross plot of fast signals and slow signals when the source is not active, i.e. the signals are due to formation activity and thermal capture γ rays only. As will be seen, most of the signal is present in a localized region γ. FIG. 6b shows the corresponding cross plot with the neutron source active. In order to obtain the neutron signal, it is necessary to remove the signal due to γ rays. This can be done by defining cutoff A and ignoring all signals below this, defining the γ region B and removing this from the total signal, or defining a region C which includes substantially only neutron signals and deriving measurements only from this region.

Figure 7:
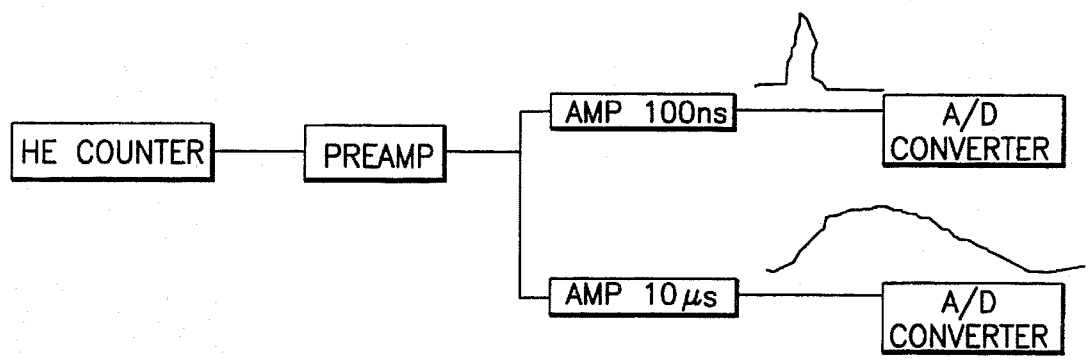
FIG. 7 shows a schematic view of the processing used for signal discrimination.

The processing scheme used to obtain the cross plots of in FIGS. 6a and 6b is shown in FIG. 7. In its simplest form, only the fast 100 ns channel is monitored. For complete information both fast and slow (10 μs) channels must be monitored and the γ ray contribution removed as described above. Similar processing is applied to both near and far detectors.

The 14-1 MeV transport in the formation is due to non-elastic reactions (mostly inelastic scattering, (n,p) and (n,α) reactions) of the neutrons with nuclei such as C, O, Si, etc. contained in the rock matrix rather than hydrogen nuclei in the pore fluid which affect the transport below 1 MeV to epithermal and thermal energies. Thus neutrons with about 1 MeV energy have had to traverse the entire 14- 1 MeV region where the non-elastic cross section is large and so show the greatest sensitivity to matrix effects (with some dependence also on hydrogen). Consequently, by determining the 14-1 MeV slowing down length $L_h$, which is possible with the present invention, it is possible to obtain formation matrix information which is not available in the prior an techniques.

Simple diffusion theory predicts a radial falloff of flux $\phi_h$ with distance r from the source according to:

$$\phi_h = \frac{S}{4\pi\Sigma_{rh}L_h^2} \frac{e^{-\left(\frac{r}{L_h}\right)}}{r}$$

where S is the source strength and $\Sigma_{rs}$ is the macroscopic cross section for removal from the energy range 1–14 MeV. Given two measurements of the 1 MeV flux at different source/detector spacings $r_1$ and $r_2$, one can measure $L_h$ directly:

$$L_h = \frac{(r_1 - r_2)}{\ln\left(\frac{r_2\phi_h(r_2)}{r_1\phi_h(r_1)}\right)}$$

Figure 9:
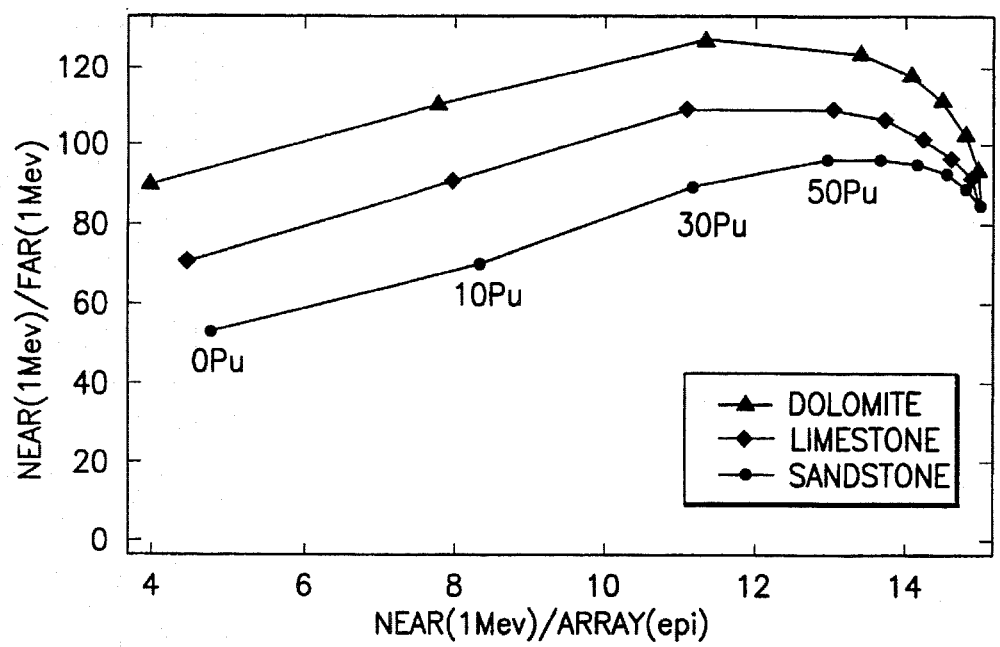
FIG. 9 shows a cross plot of near/far and near/array detector flux ratios.
Figure 8:
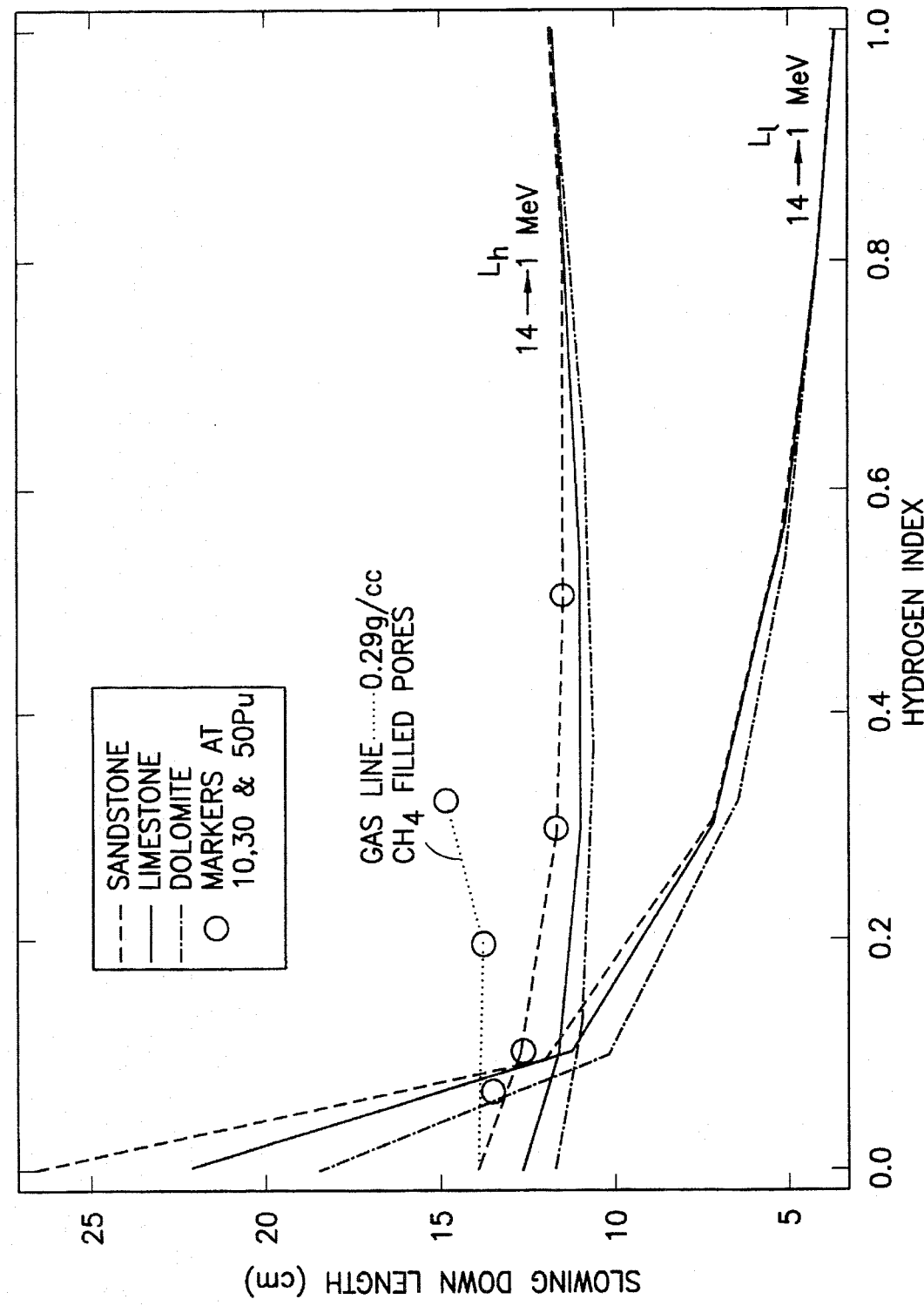
FIG. 8 shows a cross plot of slowing down length, and hydrogen index to determine matrix and identify gas.

The epithermal flux $\phi_{epi}$ follows a similar law in one group diffusion theory:

$$\phi_{epi} = \frac{S}{4\pi\Sigma_{rs}L_s^2} \frac{e^{-\left(\frac{r}{L_s}\right)}}{r}$$

where $L_s$ is the length for slowing down from 14 MeV to 0.5 eV (the cadmium cutoff). Although $L_s$ has some dependence on the matrix, flux dependence on these variations vanishes at a source/detector spacing of $2L_s$. The source factor S can be eliminated by taking a ratio with a 1 MeV flux measurement at a short source/detector spacing. Thus with an epithermal detector ($^3$He) at $2L_s$ and two 1 MeV detectors ($^4$He) at different spacings, one can measure both porosity (hydrogen index) and $L_h$. A crossplot of these two can determine matrix and identify gas as shown in FIG. 8. When considering the tool arrangement as shown in FIG. 2, calling the detectors 34, 37 and 38, "near", "array" and "far" respectively, a crossplot of the detector flux ratios can be produced as shown in FIG. 9. The three curves shown correspond to the three major rock matrices: dolomite (2.87 g/cm$^3$), limestone (2.71 g/cm$^3$) and sandstone (2.65 g/cm$^3$). The near/far and near/array ratios provide almost independent measures of matrix type and porosity, respectively.

While the present invention has been described in relation to a wireline logging tool, it will be appreciated that it can also be used in a logging-while-drilling application with the same benefit.

I claim:

1. A method of determining a characteristic of an underground formation through which a borehole passes comprising using a tool comprising a high-energy neutron source and a neutron detector, the method comprising irradiating the underground formation with neutrons from the neutron source, detecting neutrons which have passed from the source to the detector via the formation and having energies of about 1 MeV with the neutron detector which comprises a high pressure $^4$He proportional counter so as to produce a signal, and using the signal to determine the characteristic of the underground formation.

2. A method as claimed in claim 1, comprising irradiating the formation with neutrons having energies of about 14 MeV.

3. A method as claimed in claim 1, further comprising detecting neutrons at two different spacings from the neutron source.

4. A method as claimed in claim 1, comprising using the signal to determine the nature of the matrix of the formation.

5. A method as claimed in claim 1, further comprising detecting neutrons originating from the neutron source which have passed directly to a further neutron detector without passing through the underground formation.

6. A method as claimed in claim 1, comprising also detecting neutrons having epithermal energies at a detector so as to generate an epithermal neutron signal and using the epithermal neutron signal to determine a characteristic of the formation.

7. A method as claimed in claim 6, comprising using the epithermal neutron signal to determine formation porosity.

8. A method as claimed in claim 1, comprising generating neutrons at the neutron source using a D-T accelerator source.

9. A method as claimed in claim 1, comprising detecting neutrons having an energy of about 14 MeV with the neutron detector.

10. A method as claimed in claim 1, wherein the neutron detector comprises a first high pressure $^4$He proportional counter located near to the neutron source on the tool and a second high pressure $^4$He proportional counter located far from the neutron source on the tool, the method comprising detecting neutrons passing to the detector from the neutron source with the first and second $^4$He proportional counters so as to produce first and second signals, at least one of the first and second detectors detecting the 1 MeV neutrons which have passed thereto via the formation, and using the first and second signals to derive an indication of the characteristic of the underground formation.

11. A method as claimed in claim 10, comprising detecting neutrons originating from the neutron source which have passed directly to the first $^4$He proportional counter without passing though the underground formation, and detecting neutrons originating from the neutron source which have passed to the second high pressure $^4$He proportional counter via the underground formation.

12. A method as claimed in claim 11, comprising detecting neutrons having an energy of about 14 MeV at the first $^4$He proportional counter and detecting neutrons having an energy of about 1 MeV at the second high pressure $^4$He proportional counter.

13. A method as claimed in claim 10, comprising detecting neutrons originating from the neutron source which have passed to both the first and second high pressure $^4$He proportional counter via the underground formation.

14. A method as claimed in claim 13, comprising detecting neutrons having an energy of about 1 MeV at both the first and second high pressure $^4$He proportional counter.

15. A method as claimed in claim 10, comprising determining the ratio of the first and second signals to derive the characteristic of the underground formation.

16. A method as claimed in claim 1, wherein the neutron detector comprises a high pressure $^4$He proportional counter which is located near to the neutron source and is shielded with a material which interacts with high energy neutrons arriving from the neutron source so as to produce an increased number of lower energy neutrons which enter the high pressure $^4$He proportional counter compared with the number of neutrons from the neutron source, the method comprising detecting the increased number of lower energy neutrons to produce the signal which indicates the output of the neutron source.

17. A method as claimed in claim 16, comprising shielding the $^4$He proportional counter with tungsten.

18. A method as claimed in claim 17, comprising detecting neutrons having an energy of about 1 MeV in the high pressure $^4$He proportional counter.

19. Apparatus for determining a characteristic of an underground formation through which a borehole passes comprising a neutron source for irradiating the underground formation with neutrons when the apparatus is positioned in the borehole and a neutron detector comprising a high pressure $^4$He proportional counter including $^4$He at a pressure of about 40 atm for detecting neutrons originating from the source so as to produce a signal related to the characteristic of the underground formation.

20. Apparatus as claimed in claim 19, wherein the neutron detector detects neutrons originating from the neutron source which have passed directly to the neutron detector without passing through the underground formation.

21. Apparatus as claimed in claim 20, wherein the neutron detector comprises a high pressure $^4$He proportional counter shielded with a material which interacts with high energy neutrons originating with the neutron source so as to produce an increased number of lower energy neutrons which enter the high pressure $^4$He proportional counter compared with the number of neutrons arriving from the neutron source.

22. Apparatus as claimed in claim 21, wherein the material shielding the high pressure $^4$He proportional counter comprises tungsten.

23. Apparatus as claimed in claim 21, wherein the high pressure $^4$He proportional counter detects neutrons having an energy of about 1 MeV.

24. Apparatus as claimed in claim 21, further including shielding formed from a hydrogenous material to reduce epithermal neutron flux therein.

25. Apparatus as claimed in claim 19, wherein the neutron detector detects neutrons originating from the neutron source which have passed to the neutron detector via the underground formation.

26. Apparatus as claimed in claim 19, wherein the neutron source comprises a D-T accelerator source.

27. Apparatus as claimed in claim 26, wherein the neutron source generates neutrons having an energy of about 14 MeV.

28. Apparatus as claimed in claim 19, wherein the neutron detector detects neutrons having an energy of about 1 MeV.

29. Apparatus as claimed in claim 19, wherein the neutron detector comprises a first high pressure $^4$He proportional counter located near to the neutron source on the tool and a second high pressure $^4$He proportional counter located far from the neutron source on the tool which detect neutrons originating from the neutron source so as to produce first and second signals which are used to derive the signal related to the characteristic of the underground formation.

30. Apparatus as claimed in claim 29, wherein the first $^4$He proportional counter detects neutrons arriving substantially directly from the neutron source without passing though the underground formation, and the second high pressure $^4$He proportional counter detects neutrons originating from the neutron source which arrive via the underground formation.

31. Apparatus as claimed in claim 30, wherein the first $^4$He proportional counter is responsive to neutrons having an energy of about 14 MeV and the second high pressure $^4$He proportional counter is responsive to neutrons having an energy of about 1 MeV.

32. Apparatus as claimed in claim 29, wherein both the first and second high pressure $^4$He proportional counters detect neutrons originating from the neutron source which have arrived via the underground formation.

33. Apparatus as claimed in claim 32, wherein both the first and second high pressure $^4$He proportional counters detect neutrons having an energy of about 1 MeV.

34. Apparatus as claimed in claim 29, comprising means which determine the ratio of the first and second signals to derive the characteristic of the underground formation.

* * * * *